(12) United States Patent
Nguyen et al.

(10) Patent No.: US 9,313,040 B2
(45) Date of Patent: Apr. 12, 2016

(54) VERIFICATION OF COMPUTER SYSTEM PRIOR TO AND SUBSEQUENT TO COMPUTER PROGRAM INSTALLATION

(75) Inventors: Bao Nguyen, Ashburn, VA (US); Fredi Jaramillo, Ashburn, VA (US); Brian H. Hajost, Ashburn, VA (US)

(73) Assignee: SteelCloud, LLC, Ashburn, VA (US)

( * ) Notice: Subject to any disclaimer, the term of this patent is extended or adjusted under 35 U.S.C. 154(b) by 384 days.

(21) Appl. No.: 13/567,011

(22) Filed: Aug. 4, 2012

(65) Prior Publication Data
US 2014/0040990 A1 Feb. 6, 2014

(51) Int. Cl.
*G06F 15/16* (2006.01)
*H04L 12/24* (2006.01)
*H04L 29/08* (2006.01)

(52) U.S. Cl.
CPC ............... *H04L 12/24* (2013.01); *H04L 67/34* (2013.01)

(58) Field of Classification Search
None
See application file for complete search history.

(56) References Cited

U.S. PATENT DOCUMENTS

| | | | |
|---|---|---|---|
| 6,675,382 B1 * | 1/2004 | Foster | 717/177 |
| 7,266,819 B2 * | 9/2007 | Helgesen et al. | 717/176 |
| 8,010,777 B2 * | 8/2011 | Nandan et al. | 713/100 |
| 8,261,354 B2 * | 9/2012 | Kline et al. | 726/25 |
| 2003/0115461 A1 | 6/2003 | O'Neill | |
| 2003/0188160 A1 | 10/2003 | Sunder et al. | |
| 2004/0003266 A1 | 1/2004 | Moshir et al. | |
| 2006/0224544 A1 * | 10/2006 | Keith | 706/60 |
| 2007/0044077 A1 * | 2/2007 | Srivastava et al. | 717/126 |
| 2008/0320109 A1 * | 12/2008 | Andrews et al. | 709/220 |
| 2010/0031249 A1 * | 2/2010 | Baliga et al. | 717/174 |
| 2012/0155323 A1 | 6/2012 | Ramachandran et al. | |

* cited by examiner

*Primary Examiner* — Fatoumata Traore
(74) *Attorney, Agent, or Firm* — CRGO Law; Steven M. Greenberg, Esq.; Kara A. Brotman, Esq.

(57) ABSTRACT

Embodiments of the present invention provide a method, system, and computer program product for validating a computer environment. In an embodiment of the invention, a signature file denoting the infrastructure requirements of a computing environment to support a computer program to be installed in the computer environment of multiple different computing devices disposed in multiple different network domains can be loaded. Administrative network privileges to access the multiple different network domains in the computing environment can be acquired. Further, at least one deficiency in the infrastructure requirements corresponding to one of the network domains can be identified and the identified deficiency can be remediated. The identified deficiency can be reported.

17 Claims, 3 Drawing Sheets

VERIFICATION OF COMPUTER SYSTEM PRIOR TO AND SUBSEQUENT TO COMPUTER PROGRAM INSTALLATION

BACKGROUND OF THE INVENTION

1. Field of the Invention

The present invention relates to a computer enterprise system and, more particularly, to maintaining operation of the computer enterprise system.

2. Description of the Related Art

Complex computing arrangements have made the installation of computer programs on a host server complicated as client/server environment issues often lead to implementation delays. A system administrator no longer has a host server serving one type of client. As such, a system administrator no longer goes to install a computer program without expecting some errors or compatibility issues due to the multiplicity of end user computing devices. In addition, a system administrator must have cross-domain expertise to understand the variety of computing devices as well as be able to manually set-up and verify successful installation of any new computer program.

A system administrator further needs to be able to determine why an installation may have been unsuccessful for a handful of machines, while successful for others. In addition to problems that arise with the deployment of a software program, including issues of reliability, a system administrator needs to be able to identify changes in the infrastructure of an enterprise system that can bring the whole system down, such as when upgrades, patches, or new software are added to enterprise infrastructure. The administrator needs to identify whether there is a software error, an operating system issue, or human error as well as the location of the error within the system. This may involve infrastructure that can include hundreds or even thousands of individual components with an almost infinite number of combinations of software settings and configurations on multiple hosts and clients with multiple parameters.

BRIEF SUMMARY OF THE INVENTION

Embodiments of the present invention address deficiencies of the art in respect to debugging a computer system and provide a novel and non-obvious method, system, and computer program product for validating resource requirements in a computing environment. In an embodiment of the invention, a signature file denoting infrastructure requirements of a computing environment to support a computer program to be installed in the computing environment of multiple different computing devices disposed in multiple different network domains can be loaded. Administrative network privileges to access the multiple different network domains can be acquired. At least one deficiency of the infrastructure requirements corresponding to one of the network domains can be identified, remediated, and reported.

In another embodiment of the invention, a computer infrastructure debugging system can be provided. The system can include at least one computer with at least one processor and memory coupled to a computing environment of multiple different computing devices within different network domains defined over a computer communications network and an infrastructure validating module. The module can include program code enabled upon execution in memory of the at least one computer to load a signature file denoting infrastructure resources of the computing environment to support a computer program to be installed in the computer environment, to acquire administrative network privileges to access the multiple different network domains in the computing environment, and to identify at least one deficiency of the infrastructure requirements in a corresponding network domain. The program code of the module can further include program code to remediate the identified deficiency and to report the identified deficiency.

Additional aspects of the invention will be set forth in part in the description that follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for validating a computing environment to ensure that the computing environment has been properly configured to support proper operation of an installed computer program. In accordance with an embodiment of the invention, infrastructure validating logic can execute in memory of a computer coupled to a computing environment of different computing devices within different network domains defined over a computer communications network. The logic can first acquire administrative-level access to the different network domains and thereafter can validate the different network domains including computing devices disposed therein as being able to support the installation of the computer program according to infrastructure requirements, and in particular, resource requirements denoted within an XML signature file. Upon determining a deficiency in terms of the infrastructure requirements, the logic can access a device within a corresponding one of the network domains in which the determined deficiency exists in order to remediate the deficiency. Further, the logic can report the identified deficiency. When no deficiencies are determined to remain, the logic can also report the ability to proceed in deploying the computer program to the computing environment.

Figure 1:
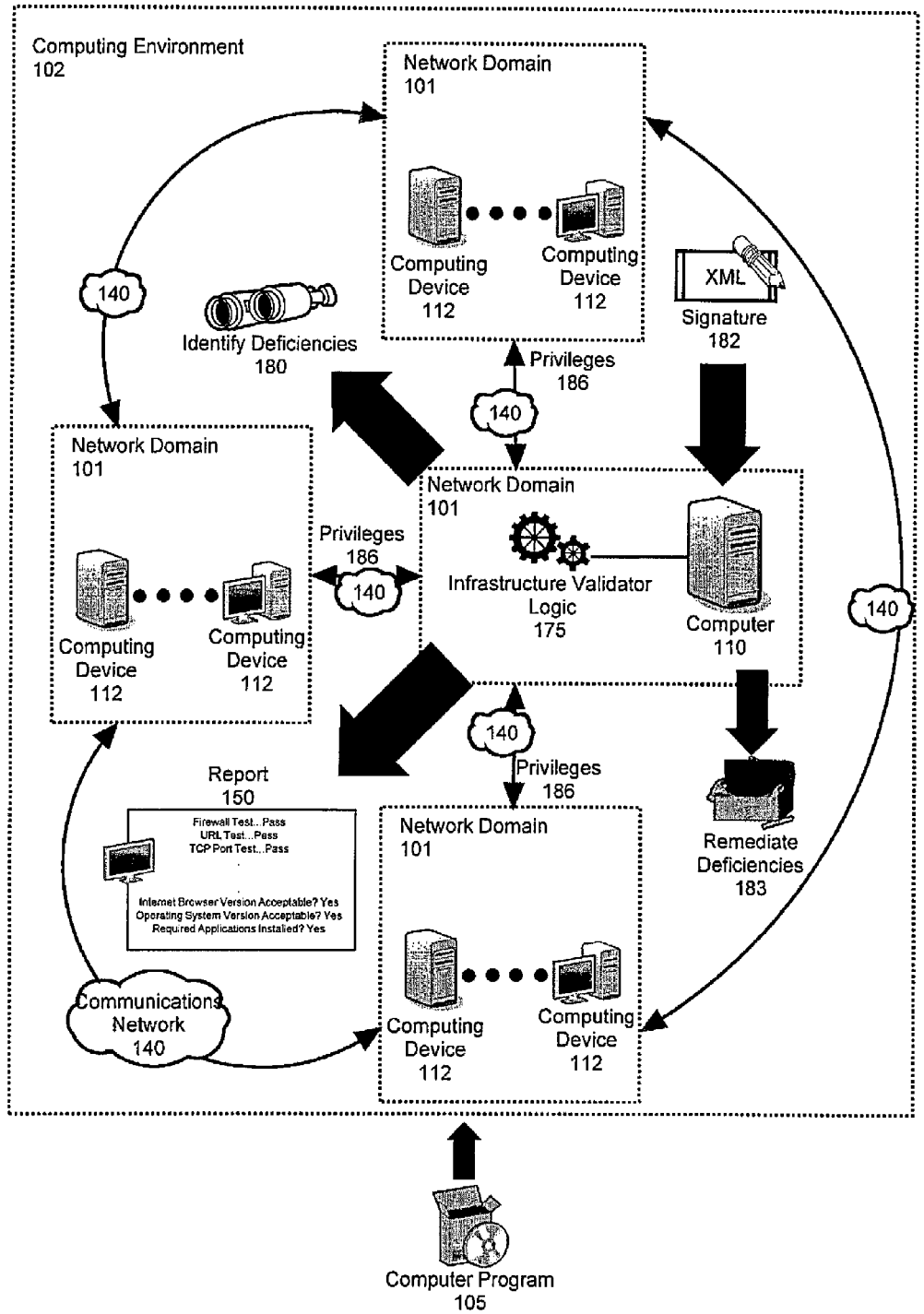
FIG. 1 is a pictorial illustration of a process for validating infrastructure resources in a computing environment.

In further illustration, FIG. 1 depicts a process for validating infrastructure resources in a computing environment 102 to ensure that the computing environment 102 has been properly configured to support operation of an installed computer program 105. Of note, the computing environment 102 can include different computing devices 112 within different network domains 101 defined over a communications network 140. The process for validating infrastructure resources can be used for validating the computing environment 102 before the installation of a computer program 105 or anytime after to debug the infrastructure of a computing environment 102 when an error or other issue occurs.

As seen in FIG. 1, infrastructure validating logic 175 on a computer 110 in a network domain 101 can load a signature file 182 denoting the infrastructure requirements to support a computer program 105 to be installed in the computer environment 102. The infrastructure requirements can include the resource requirements of the computing devices 112 of the multiple different network domains 101, where resource requirements can include, but are not limited to, available disk storage, available network bandwidth, and available processing power. Infrastructure requirements can also include security rights established for a particular network domain 101 as well as network connectivity established for a network resource within the computing environment. Of note, the signature file 182 can be formatted according to the extensible markup language (XML). The logic 175 can further acquire administrative network privileges 186 for the different network domains 101 and identify deficiencies 180 of the infrastructure requirements in one of the network domains 101. The identified deficiencies 180 can be remediated 183, if the security rights allow. The identified deficiency can be reported 150 to an end user and/or logged.

Upon determining that no deficiencies of the infrastructure requirements can be identified, infrastructure validating logic 175 can report to an end user, for instance, the ability to install the computer program 105. Further, the logic 175 can prompt a user for configuration data before a user, usually a system administrator or end user, installs a computer program 105 on a computer 110. Of note, configuration data 125 can include, but is not limited to, (1) administration account information, for instance domain, user name, and user password, (2) SQL server information, such as server name, path, type of authentication (Windows® or SQL), user name, password for the SQL Server®, and (3) Microsoft® Exchange server information, including name and path, and location where log reports will be generated. Of further note, infrastructure validating logic 175 can trap the configuration data so it can be utilized in the installation of the computer program 105 after verification. The XML signature 182 can replace hard coding of detail logic, which serves to identify any requirements for installation and proper functioning of the computer program 105 in the computing environment 102. Specifically, the XML signature 182 can include information relating to the resources—for instance computer program prerequisites and IT environment requirements—required for the proper installation and subsequent functioning of a computer program 105, including but not limited to network connectivity, available disk storage, available network bandwidth, and available processing power.

Of further note, resource requirements can further include both computer program prerequisites and IT environment requirements, which can include, but are not limited to, external and internal URL access, database connectivity, firewall ports and settings, existence of required software (such as a mail program or web browser), and version validation of required software. Resources can also include identifying a particular arrangement of computer program prerequisites and IT environment settings, such as the existence that certain software does not exist (test for the negative), connectivity to other systems (i.e. MS EXCHANGE, web servers, etc.), set-up and configuration of other systems (i.e. MS EXCHANGE, web servers, etc.), validation of security settings for one or more users and/or administrators (i.e. Active Directory) required to administer an application, validation of versions and existence any widget or other applications (i.e. specific version of Java, .Net, etc.), local security settings in Windows, local Windows policy settings, and local Windows services settings. In other words, resource requirements can identify specific settings (whether for a computer program or for system infrastructure) required as well as identify and/or run tests or other checks to ensure all settings are appropriate for successful installation of a computer program or for proper infrastructure functioning.

In one instance, a validation scan of the existing resources can be conducted after the infrastructure validating logic 175 assumes the security profile of the computer 110 and computer program 105 to determine whether the required resources 183 are met. In another instance, a computer environment 102 can be probed so that any existing resources in the computer environment 102 can be identified. The identified existing resources can be stored after infrastructure validating logic 175 assumes the security profile. The results 150 of the validation scan can be displayed. Further, infrastructure validating logic 175 can log the results of the validation scan so that a user can have a description of the success or failure of the validation scan. In an embodiment of the invention, if the required resources are in place (i.e. the existing resources meet the required resources), a user can direct the installation of the computer program 105 after being prompted via a dialog box, for instance, to continue with the installation of the computer program 105. If the required resources are found not to have been satisfied, i.e. a deficiency is identified, a user 115 can be informed of the error and be prompted to correct any missing or failed requirement.

In addition to verifying the presence of any required resources 183 before a computer program 105 is installed, infrastructure validating logic 175 can be executed at any time an anomaly is detected in the operation of the computer program 105, so as to assist a user to debug the anomaly. After the security profile of the network domain 101 is adopted, infrastructure validating logic 175 can probe the computing environment 102, including the different network domains 101, to identify existing resources, which can be stored. An XML signature 182, specifying the required resources, can be loaded so that the required resources and the existing resources can be compared. A report 150 of the results of the comparison can then be provided. Of note, the results of the comparison can be displayed to an end user. In addition, a log showing all activities conducted can include the results of the comparison.

Of note, missing or incorrect resources for the computer program 105 or for the computing environment 102 can be automatically corrected, when possible. Adjustments prior to the installation of a computer program 105 and/or to support the computing environment 102 are possible, because infrastructure validating logic 175 has cross-domain access to each separate domain or enclave (each network domain 101) in the computing environment 102, for instance any database administration account, e-mail account, application administration account, etc. In other words, infrastructure validating logic 175 has access to each separately administered or secured infrastructure within the greater computing environment 102, which enables infrastructure validating logic 175 to make adjustments when needed (assuming the security permissions of the domains allow such) in order to properly configure or reconfigure the infrastructure accounts (database, application, e-mail, etc.) prior to installation of a computer program 105 or subsequently, when there is a system infrastructure anomaly. Further, the infrastructure validating logic 175 can be associated with the documentation of the computer program 105 so, when an error is encountered, the user is displayed the specific documentation supplied by the vendor of the computer program 105 related to the error encountered.

Figure 2:
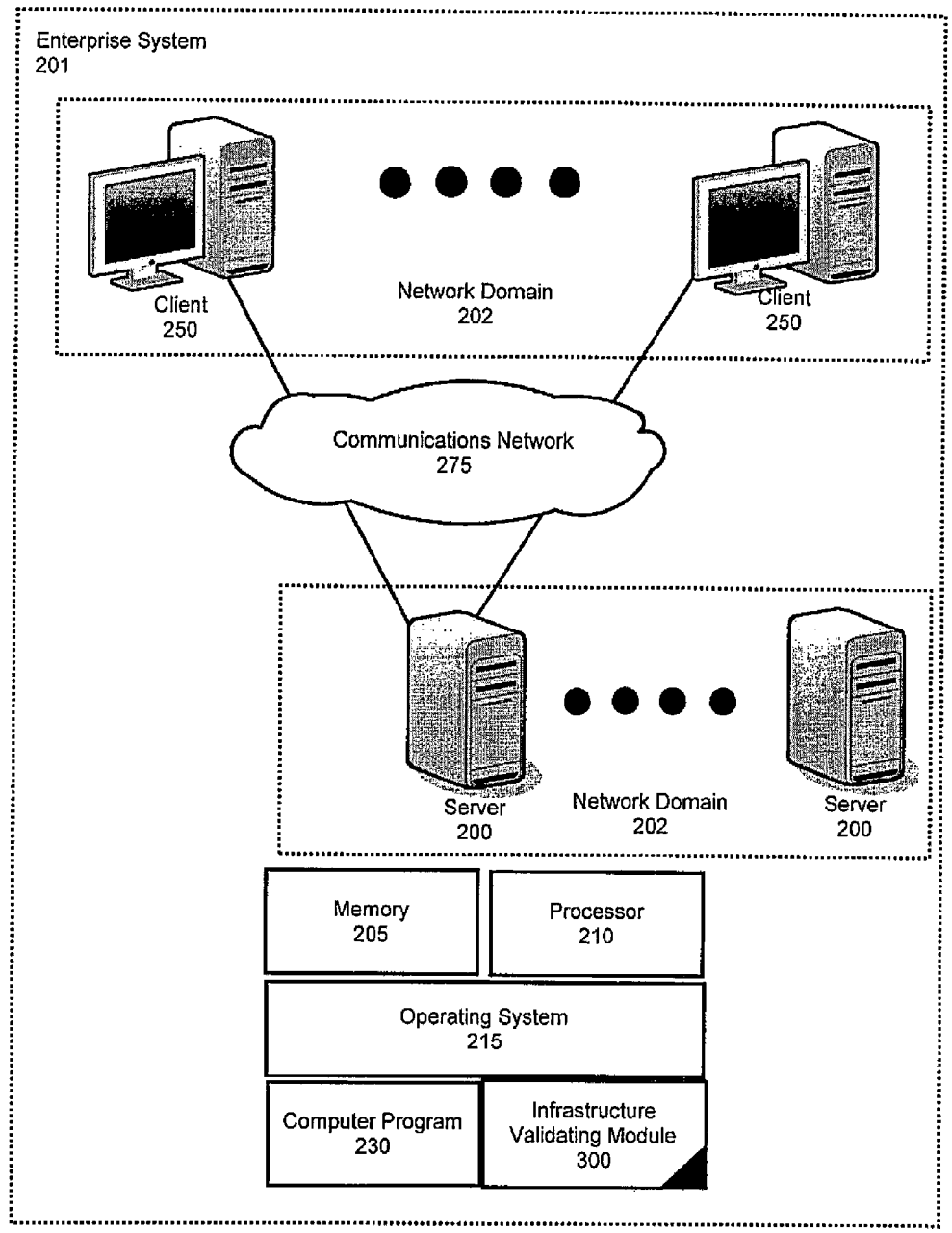
FIG. 2 is a schematic illustration of an infrastructure debugging system configured for validating a computer before installation of a computer program or for debugging an enterprise system; and, FIG. 3 is a flow chart illustrating a process for validating resources in a computing environment before or after installing a program on a computing device in a computing environment of multiple different network domains.

The process described in connection with FIG. 1 can be implemented in an infrastructure debugging system. In further illustration, FIG. 2 schematically shows an infrastructure debugging system configured for validating a computer or computer system before or after installing a computer program on the computer in an enterprise computer system. Of note, installation of a computer program 230 is not required for the infrastructure validating module 300 to be utilized in debugging the infrastructure of an enterprise system 201. The infrastructure debugging system can include at least one client 250 coupled to at least one server 200 via a communications network 275 in an enterprise system 201. The server 200 includes at least one processor 210 and memory 205 supporting the execution of an operating system (O/S) 215. The O/S 215 can, in turn, support a computer program 230 and an infrastructure validating module 300, which can be used to validate the IT environment and the prerequisites (the resources) required for the computer program 230 to ensure the environment is properly set up to allow the computer program 230 to both be installed and run properly on the enterprise system 201. In other words, the infrastructure validating module 300 can also be used to debug the enterprise system 201 when an anomaly is detected or when something in the system stops working, for instance printing or e-mail. The infrastructure validating module 300 can include program code, which, when executed by at least one processor 210 of the server 200, can load a signature file denoting the infrastructure requirements of the enterprise system 201 to support a computer program 230 being installed in the enterprise system 201 with multiple different computing devices (including clients 250 and servers 200), which can be in different network domains 202. Of note, the signature file is formatted according to extensible markup language (XML) and can include the infrastructure requirements, which can include the resource requirements of the various servers and clients in the different network domains 202. The resource requirements can include requirements selected from the group consisting of available disk storage, available network bandwidth and available processing power. Further, the module 300 can include program code that can acquire administrative network privileges to access the different network domains 202. The infrastructure validating module 300 can identify at least one deficiency in the enterprise system 201. Further, the identified deficiency can be remediated as well as reported. In addition, the module 300 can include program code that can report the ability to install a computer program 230 when no deficiencies of the infrastructure requirements can be identified in the enterprise system 201.

In addition, the infrastructure validating module 300 can include program code to prompt a user for configuration data upon receiving a request for installing a computer program 230. Once a user enters the configuration data, which can include indicating the additional servers in a network, such as a mail server, the program code of the infrastructure validating module 300 can trap the configuration data for later use in the installation process after the environment and computer program prerequisites are validated.

Thereafter, the program code of the infrastructure validating module 300 can utilize computer program signatures to identify resources, including computer program prerequisites and environment properties, upon adopting the security profile of the different network domains 202. Of note, the infrastructure validating module 300 can also adopt administrative-level setting for each separate domain or enclave in an enterprise system 201, including, but not limited to, e-mail systems, database systems, application systems, and network security systems. This cross-domain access provides the infrastructure validating module 300 with access to each administered and/or secured infrastructure within the greater enterprise infrastructure. In this way, the infrastructure validating module 300 can make adjustments to different settings necessary to install a computer program 230 or support/debug the enterprise system 201. Further, the program code of the infrastructure validating module 300 can perform a validation scan of the IT environment to validate that the environment (any resource) is properly set. The program code of the module 300 can log the results of any validation scan. The results of the scans can further be displayed to a user on a client 250. Upon determination that the resources are met, the program code of the infrastructure validating module 300 can direct installation of the computer program 230 for a user affirmative selecting to install the computer program 230 on the validated environment.

Upon determination that the resources are not met, the program code of the infrastructure validating module 300 can display any error with the corresponding documentation, if available, that a vendor of the computer program 230 specified. The module 300 can automatically correct resources, when possible. In addition, the module 300 can, via prompt, ask a user if he/she wishes to continue, thus allowing the user to address any resources before proceeding.

If, after installation of the computer program 230, an anomaly is detected during the operation of the installed computer program 230 or in the enterprise system 201 itself, the program code of the infrastructure validating module 300 can be utilized in debugging both the anomaly and, more specifically, the IT environment by identifying the existing resources in the enterprise system 201 in response to adopting a security profile of the enterprise system 201. Of note, the security profile can be a multi-domain security profile. Upon storing the identified existing resources 205, the program code of the module 300 can load an XML signature that indicates the required resources. The required resources and the existing resources can be compared, and the result of the comparison can be reported by the infrastructure validating module 300.

Of note, if the program code of the module 300 can determine a disparity upon comparing the required resources to the existing resources, the program code of the infrastructure validating module 300 can make adjustments to different settings (resources) provided that the security permissions of the cross-domain security profile allow for reconfigurations and/or updates to resources. In addition, a log can be used to record all activities of the module 300 as well as the results of the comparison. Further, the results of the comparison can be displayed to an end user. Even further, the program code of the infrastructure validating module 300 can display any messages, including error messages, with the corresponding documentation, if available, that a vendor supplied.

Figure 3:
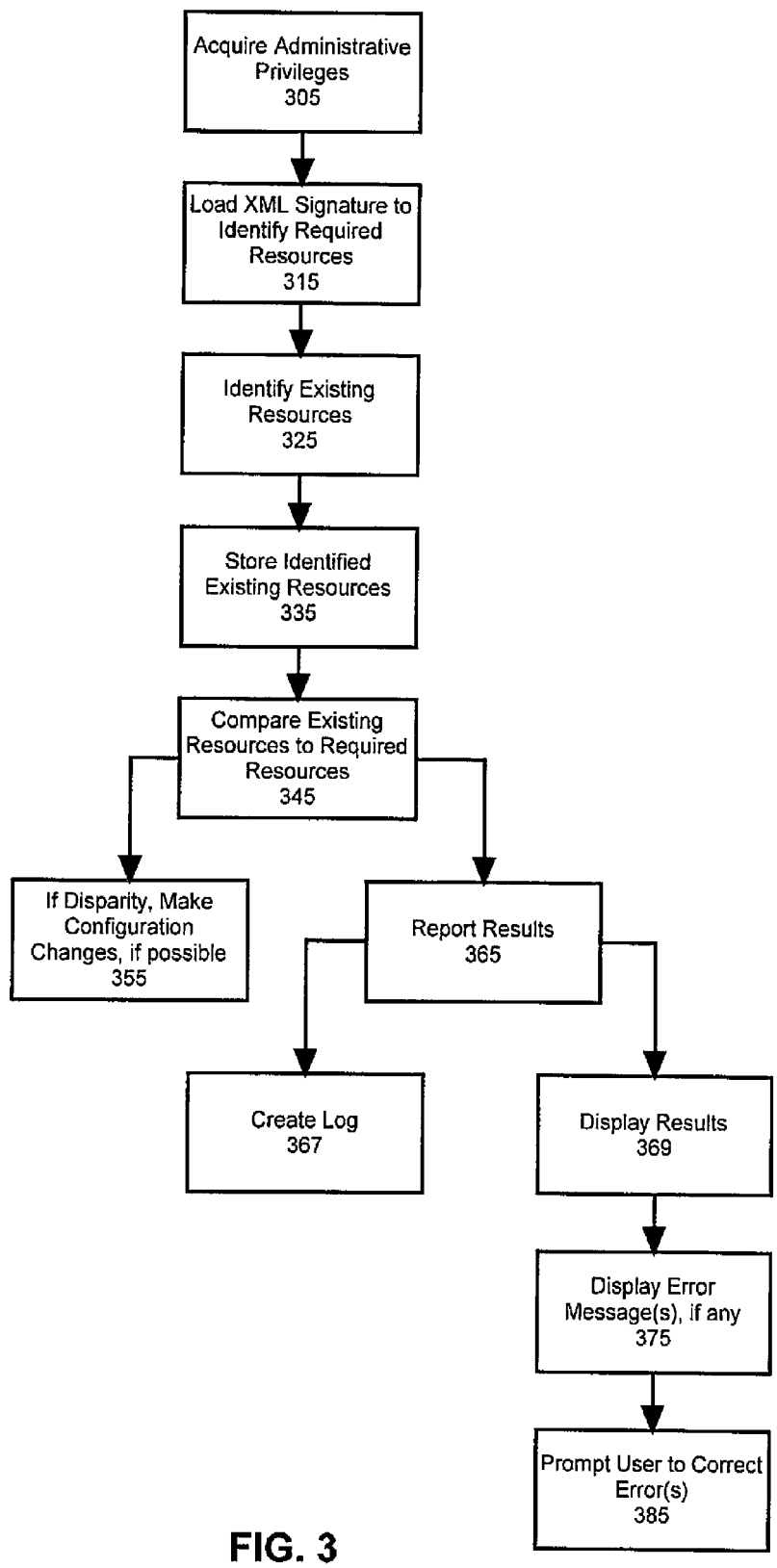

In even yet further illustration of the operation of the program code of the infrastructure validating module 300, FIG. 3 is a flow chart illustrating a process for debugging the infrastructure of a computing environment in an embodiment of the invention. After an end user receives a report of an anomaly in the system, from either another end user or from the system itself, the program code of the infrastructure validating module 300 can be initiated, by an end user, for instance, such that the module 300 acquires administrative privileges, as shown in block 305. Of note, the infrastructure validating module 300 can adopt the privileges of each domain (each separately administered or secured infrastructure within the greater enterprise infrastructure), such as email, database, security, and application. In other words, the module 300 can handle a multitude of domain accounts and is, thus, cross domain capable. Of note, the infrastructure validating module 300 can be initiated automatically, without end user involvement, at the detection of an anomaly in the computing environment. An anomaly can include any issue, problem, etc. that prevents the computing environment from working properly, for instance not being able to send e-mail.

Upon acquiring administrative privileges, the infrastructure validating module 300 can load an XML signature, as shown in block 315. The XML signature can be an XML file identifying the resource requirements for the computing environment. Of note, it is the required resources that identify the resources in the target computer system needed so that the target computer system can function properly. In other words, the XML signature identifies the infrastructure settings required for the computing environment to function properly. The infrastructure validating module 300 can identify existing resources in the computing environment, as shown in block 325. Resources can include both specific computer program settings and IT environment settings. Further, the possible resources that can be identified by the module 300 are not limited to a specific set of settings or values, but can include the current settings in an e-mail server, the current Java version(s) in use, firewall port rules, .NET version, etc. As illustrated in block 335, the identified existing resources can be stored.

The required resources can be compared to the identified existing resources, as indicated in block 345. If any disparities are identified between the existing resources and the required resources, the module 300 can make configuration changes, if possible, as illustrated in block 355. As the infrastructure validating module 300 adopts a multitude of domain accounts, which allows it access to each separately administered or secured infrastructure network domain within the greater computing environment, the module 300 can make configuration changes on-the-fly across multi-domains to properly configure identified mismatched resources between required resources and existing resources when security rights set in the adopted domain accounts allow for such changes.

Further, the results of the comparison of the existing resources to the required resources can be reported, as shown in block 365. A log of all activities can be created, as in block 367. The log can include the results of the comparison, including any disparities, warnings, acceptances, and passes. In addition, if there is an error generated, the log can include the error message along with any vendor-supplied documentation related to the error, if available. As shown in block 369, the results of the comparison can also be displayed to an end user. In one embodiment, each required resource can be displayed with a color coded pass/fail/warning (green/red/yellow, respectively). In addition, as illustrated in block 375, if an error is generated, the display can show the error message along with any vendor-supplied documentation related to the error, if such documentation is available. An end user can further be prompted to correct any errors, as indicated in block 385. In this way, infrastructure validating module 300 can be used to debug a computer target system.

In another embodiment of the invention, the infrastructure validating module 300 can also validate a computer and the system of which it is part before installing a computer program on a computer. After a computer program installation request is received, a user can be prompted to provide configuration data, which can relate to the IT environment of the user. The configuration data can be trapped for use in the installation of the computer program after the configuration data has been validated. The security profile of the computer/computer program can be adopted. In this way, additional security access does not need to be addressed. The required resources needed for the computer program to be both installed and function properly after installation can be read from an XML signature specific to the computer program. The XML signature can be a XML file that specifies the specific resources (computer program prerequisites and IT environment requirements) required for the system, within which the computer program is being installed.

A validation scan of the IT environment can be performed, so a determination as to whether the resources specified in the XML signature are met. The results of the validation scan can be stored, logged, and/or displayed. In this way, the information captured can be used to auto-fill account, system, and database information during the installation of a computer program or used in the debugging of the computing environment. For instance, the infrastructure validating module 300 can display for a user the tests and/or checks run and whether the test/check was successful for any resource checked. Further, any required resource can be tagged with a pass (green)/fail (red)/warning (yellow) system in the display. More specifically, if the transmission control protocol (TCP) port test was successful, a green check mark indicating such can be displayed. As a further example, if an installation requirement is whether a mail program is installed and it is determined that a mail program is installed, then, again, a green check mark indicating success can be displayed. If all resources are met, a user can be directed to proceed with installation of the computer program. In one instance, the user can be prompted with a dialog box asking whether the user wishes to proceed with the installation of the computer program. If the user does select to proceed with the installation, the now verified configuration data trapped can be used in the installation of the computer program.

Regardless of whether a validation scan determines that the resources are met, a log can be created. The log can list all the results of the validation scan, so a user has a description of what was successfully validated and what was not. Further, the results of a validation scan can be displayed in any manner; for instance, a negative or a failed validation of an installation requirement can be displayed as a red (x) or a yellow exclamation point (!). Of note, any error message can be displayed with the vendor-supplied documentation corresponding to the error, if available. In addition, the module 300 can correct incorrect installation parameters, when possible. A user can also be prompted to correct any errors. Once any errors have been corrected (or new information entered), the validation scan can be performed again.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied therein.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied in a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention in various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. An infrastructure validation method comprising:
loading a signature file into memory of a computer, the signature file denoting infrastructure requirements of a computing environment to support a computer program to be installed in the computing environment of multiple different computing devices disposed in multiple different network domains, the infrastructure requirements including security rights established for a particular one of the different network domains, each different network domain is at least separately administered or separately secured;
acquiring, by a processor of the computer, administrative network privileges to access the multiple different network domains in the computing environment;
identifying, by the processor of the computer, at least one deficiency of the infrastructure requirements in a corresponding one of the different network domains;
remediating the identified deficiency of the infrastructure requirements identified in the corresponding one of the different network domains; and,
reporting the identified deficiency of the infrastructure requirements identified in the corresponding one of the different network domains.

2. The method of claim 1, further comprising:
reporting an ability to install the computer program only when no deficiencies of the infrastructure requirements can be identified in the computing environment.

3. The method of claim 1, wherein the infrastructure requirements further comprises resource requirements of the computing devices of the multiple different network domains.

4. The method of claim 1, wherein the signature file is formatted according to the extensible markup language (XML).

5. The method of claim 3, wherein the resource requirements further comprises requirements selected from the group consisting of available disk storage, available network bandwidth, and available processing power.

6. The method of claim 1, wherein the infrastructure requirements further comprises network connectivity established for a network resource within the computing environment.

7. A computer infrastructure debugging system comprising:
at least one computer with at least one processor and memory coupled to a computing environment of multiple different computing devices within different network domains defined over a computer communications network, each different network domain is at least separately administered or separately secured; and,
an infrastructure validating module executing in memory of the at least one computer, the infrastructure validating module comprising program code enabled to load a signature file into the memory of the at least one computer, the signature file denoting infrastructure requirements of the computing environment to support a computer program to be installed in the computing environment, the infrastructure requirements including security rights established for a particular one of the different network domains, to acquire administrative network privileges to access the multiple different network domains in the computing environment, to identify at least one deficiency of the infrastructure requirements in a corresponding one of the different network domains, to remediate the identified deficiency of the infrastructure requirements identified in the corresponding one of the different network domains, and to report the identified deficiency of the infrastructure requirements identified in the corresponding one of the different network domains.

8. The system of claim 7, wherein the program code of the infrastructure validating module is further enabled to report an ability to install the computer program only when no deficiencies of the infrastructure requirements can be identified in the computing environment.

9. The system of claim 7, wherein the infrastructure requirements further comprises resource requirements of the computing devices of the multiple different network domains.

10. The system of claim 9, wherein the resource requirements further comprises requirements selected from the group consisting of available disk storage, available network bandwidth, and available processing power.

11. The system of claim 7, wherein the signature file is formatted according to the extensible markup language (XML).

12. A computer program product for verifying a computer environment, the computer program product comprising:
a non-transitory computer readable storage medium having computer readable program code embodied therewith, the computer readable program code comprising:
computer readable program code for loading a signature file into memory of a computer, the signature file denoting infrastructure requirements of a computing environment to support a computer program to be installed in the computing environment of multiple different computing devices disposed in multiple different network domains, the infrastructure requirements including security rights established for a particular one of the different network domains, each different network domain is at least separately administered or separately secured;
computer readable program code for acquiring, by a processor the computer, administrative network privileges to access the multiple different network domains in the computing environment;
computer readable program code for identifying, by the processor of the computer, at least one deficiency of the infrastructure requirements in a corresponding one of the different network domains;
computer readable program code for remediating the identified deficiency of the infrastructure requirements identified in the corresponding one of the different network domains; and,
computer readable program code for reporting the identified deficiency of the infrastructure requirements identified in the corresponding one of the different network domains.

13. The computer program product of claim 12, further comprising computer readable program code for reporting an ability to install the computer program only when no deficiencies of the infrastructure requirements can be identified in the computing environment.

14. The computer program product of claim 12, wherein the infrastructure requirements further comprises resource requirements of the computing devices of the multiple different network domains.

15. The computer program product of claim 14, wherein the resource requirements further comprises requirements selected from the group consisting of available disk storage, available network bandwidth, and available processing power.

16. The computer program product of claim 12, wherein the signature file is formatted according to the extensible markup language (XML).

17. The computer program product of claim 12, wherein the infrastructure requirements further comprises network connectivity established for a network resource within the computing environment.

\* \* \* \* \*